US010205586B2

(12) United States Patent
Paul et al.

(10) Patent No.: US 10,205,586 B2
(45) Date of Patent: Feb. 12, 2019

(54) METHOD AND APPARATUS FOR NETWORK SYNCHRONIZATION

(71) Applicant: MARVELL WORLD TRADE LTD, St. Michael (BB)

(72) Inventors: Gideon Paul, Modiin (IL); Erez Reches, Koranit (IL); Zvi Leib Shmilovici, Tel Aviv (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 186 days.

(21) Appl. No.: 15/423,275

(22) Filed: Feb. 2, 2017

(65) Prior Publication Data

US 2017/0222792 A1    Aug. 3, 2017

Related U.S. Application Data

(60) Provisional application No. 62/290,023, filed on Feb. 2, 2016.

(51) Int. Cl.
| | |
|---|---|
| *H04J 3/06* | (2006.01) |
| *H04L 7/033* | (2006.01) |
| *H04L 25/03* | (2006.01) |

(52) U.S. Cl.
CPC ............ *H04L 7/033* (2013.01); *H04J 3/0697* (2013.01); *H04L 7/0331* (2013.01); *H04L 25/03273* (2013.01); *H04J 3/0658* (2013.01)

(58) Field of Classification Search
CPC ...................................... H04J 3/0635–3/0697
USPC .................................................. 375/354–376
See application file for complete search history.

(56) References Cited

U.S. PATENT DOCUMENTS

| | | | | | |
|---|---|---|---|---|---|
| 4,737,722 | A | * | 4/1988 | Ramesh | ................ H04L 7/0331 327/141 |
| 5,185,736 | A | * | 2/1993 | Tyrrell | ...................... H04J 3/08 370/358 |
| 5,519,737 | A | * | 5/1996 | Brun | ..................... H04J 3/0685 370/465 |
| 5,689,808 | A | * | 11/1997 | Sandahl | ................. H04H 20/67 375/356 |

(Continued)

FOREIGN PATENT DOCUMENTS

EP         0 589 117 A1        3/1994

OTHER PUBLICATIONS

International Search Report and Written Opinion dated Jul. 24, 2017 in PCT/IB2017/000224.

*Primary Examiner* — James M Perez

(57) ABSTRACT

A network device includes a packet processor, a plurality of interface circuits, a phase-locked loop (PLL) circuit and a configuration controller. The interface circuits are configured to transmit and receive signals to/from other devices that are coupled to the network device. A master interface circuit among the interface circuits is configured to recover a network clock from a received signal. The PLL circuit is configured to generate an interface clock based on a system clock of the network device and a configuration of the PLL circuit and to provide the interface clock to the plurality of interface circuits to govern communication timings of the interface circuits. The configuration controller is configured to detect a difference of the interface clock relative to the recovered network clock, and to determine the configuration of the PLL circuit based on the difference to govern operation of the PLL circuit.

20 Claims, 3 Drawing Sheets

(56) References Cited

U.S. PATENT DOCUMENTS

| | | | | |
|---|---|---|---|---|
| 5,982,828 A * | 11/1999 | Fujimori | H04N 21/4305 | 348/E5.003 |
| 6,178,216 B1 * | 1/2001 | Lee | H04J 3/0688 | 327/147 |
| 6,230,021 B1 * | 5/2001 | Ohdachi | H03J 7/065 | 370/324 |
| 6,275,549 B1 * | 8/2001 | Greatwood | G06F 1/12 | 375/219 |
| 6,658,579 B1 * | 12/2003 | Bell | H04L 7/0008 | 713/400 |
| 6,658,580 B1 * | 12/2003 | Bell | G06F 1/14 | 331/2 |
| 6,983,009 B2 * | 1/2006 | Lomp | H04B 1/707 | 375/149 |
| 7,039,046 B1 * | 5/2006 | Simons | H04L 49/15 | 370/218 |
| 7,602,811 B2 * | 10/2009 | Porter | H04J 3/0632 | 370/503 |
| 7,804,341 B2 * | 9/2010 | Bazes | H03K 3/356113 | 327/147 |
| 8,250,399 B1 * | 8/2012 | Mizrahi | H04J 3/0658 | 326/93 |
| 8,433,027 B2 * | 4/2013 | Hammond | H03L 7/07 | 327/156 |
| 8,866,520 B1 * | 10/2014 | Pham | G06F 1/10 | 327/156 |
| 9,094,908 B1 * | 7/2015 | Shor | H04J 3/0685 | |
| 9,277,256 B2 * | 3/2016 | Danielsson | H04J 3/0638 | |
| 9,537,590 B2 * | 1/2017 | Cooke | H04J 3/0638 | |
| 2002/0027966 A1 * | 3/2002 | Fukuhara | H03L 7/081 | 375/376 |
| 2002/0080901 A1 * | 6/2002 | Ham, III | H03L 7/107 | 375/376 |
| 2004/0032883 A1 * | 2/2004 | Knapp | H04J 3/0647 | 370/509 |
| 2004/0032922 A1 * | 2/2004 | Knapp | H04J 3/0647 | 375/356 |
| 2005/0078683 A1 * | 4/2005 | Page | G10H 1/0058 | 370/395.5 |
| 2008/0109672 A1 * | 5/2008 | Godiwala | H04J 3/0658 | 713/401 |
| 2008/0159270 A1 * | 7/2008 | Burke | H04J 3/0697 | 370/352 |
| 2008/0187083 A1 * | 8/2008 | Tapie | H03L 7/085 | 375/371 |
| 2008/0270818 A1 * | 10/2008 | Joordens | G06F 1/10 | 713/500 |
| 2009/0072858 A1 * | 3/2009 | D'Souza | H03K 19/177 | 326/47 |
| 2009/0238154 A1 * | 9/2009 | Bommas | H04B 7/2693 | 370/336 |
| 2009/0276542 A1 * | 11/2009 | Aweya | H04J 3/0667 | 709/248 |
| 2010/0020829 A1 * | 1/2010 | Ruffini | H04J 3/0632 | 370/509 |
| 2010/0118894 A1 * | 5/2010 | Aweya | G06F 1/0328 | 370/503 |
| 2010/0158051 A1 * | 6/2010 | Hadzic | H03L 7/085 | 370/503 |
| 2010/0158181 A1 * | 6/2010 | Hadzic | H03L 7/085 | 375/371 |
| 2010/0158183 A1 * | 6/2010 | Hadzic | H03L 7/087 | 375/376 |
| 2011/0080985 A1 * | 4/2011 | Secker | H03L 7/18 | 375/376 |
| 2011/0200051 A1 * | 8/2011 | Rivaud | H04J 3/0641 | 370/400 |
| 2012/0087402 A1 * | 4/2012 | Patoine | H04J 3/0697 | 375/226 |
| 2012/0155476 A1 * | 6/2012 | Pavani | H04J 3/0632 | 370/400 |
| 2012/0324270 A1 * | 12/2012 | Magee | H04J 3/0688 | 713/400 |
| 2013/0100967 A1 * | 4/2013 | Secker | H04J 3/0691 | 370/503 |
| 2014/0022887 A1 * | 1/2014 | Rao | G06F 11/2028 | 370/216 |
| 2014/0192797 A1 * | 7/2014 | Licardie | H04J 3/0658 | 370/350 |
| 2015/0071309 A1 * | 3/2015 | Aweya | H04J 3/0682 | 370/503 |
| 2015/0092796 A1 * | 4/2015 | Aweya | H04J 3/0667 | 370/516 |
| 2015/0092797 A1 * | 4/2015 | Aweya | H04J 3/0667 | 370/516 |
| 2015/0110162 A1 * | 4/2015 | Van Den Bosch | H04B 1/38 | 375/219 |
| 2015/0156009 A1 * | 6/2015 | Bogdan | H04L 27/2601 | 375/376 |
| 2015/0188798 A1 * | 7/2015 | Mizrahi | H04L 43/0829 | 370/252 |
| 2015/0280956 A1 * | 10/2015 | Bogdan | H04L 27/2656 | 375/375 |
| 2015/0349784 A1 * | 12/2015 | Bogdan | H03K 5/15013 | 375/376 |
| 2016/0080138 A1 * | 3/2016 | Biederman | H04L 7/0037 | 375/354 |
| 2016/0218855 A1 * | 7/2016 | Bosch | H04B 1/38 | |
| 2017/0099131 A1 * | 4/2017 | Bosch | H04L 7/0016 | |
| 2017/0214516 A1 * | 7/2017 | Rivaud | H04L 7/033 | |
| 2017/0222686 A1 * | 8/2017 | Khan | H04B 1/40 | |
| 2018/0254882 A1 * | 9/2018 | Bogdan | H04L 7/0087 | |

* cited by examiner

METHOD AND APPARATUS FOR NETWORK SYNCHRONIZATION

INCORPORATION BY REFERENCE

This present disclosure claims the benefit of U.S. Provisional Application No. 62/290,023, "SYNC-E IMPLEMENTATION IN SWITCH DEVICES" filed on Feb. 2, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Some networks transmit a synchronization signal between network nodes to synchronize network communication of the network nodes. In an example, a mobile network includes a backbone network that is implemented according to a synchronous Ethernet standard. In the example, a synchronization signal is transmitted over the Ethernet physical layer to nodes in the backbone network. Conventionally, nodes in the backbone network are coupled to external circuitry, for example a dedicated telco PLL, that is configured to externally generate and to supply synchronized clock signals conforming to the synchronization signal. Communication activities are performed based on synchronized clock signals provided by the external telco PLL.

SUMMARY

Aspects of the disclosure provide a network device. The network device includes a packet processor, a plurality of interface circuits, a phase-locked loop (PLL) circuit and a configuration controller. The interface circuits are configured to transmit and receive signals to/from other devices that are coupled to the network device. One of the plurality of interface circuits is assigned as a master interface circuit. The master interface circuit is configured to recover a network clock from a received signal. The PLL circuit is configured to generate an interface clock based on a system clock of the network device and a configuration of the PLL circuit and to provide the interface clock to the plurality of interface circuits to govern communication timings of the interface circuits. The configuration controller is configured to detect a difference of the interface clock relative to the recovered network clock, and to determine the configuration of the PLL circuit based on the difference to govern operation of the PLL circuit. In an example, the PLL circuit and the configuration controller form a closed loop control system that compensates for a frequency deviation due to drift in time or any other reason. In an embodiment, the PLL circuit and the configuration controller are implemented using an existing on chip cleaning jitter PLL, additional frequency deviation measuring logic and software instructions that are executed by a processor, such as an existing on chip processor.

According to an aspect of the disclosure, the configuration controller is configured determine the configuration of the PLL circuit to align the interface clock to the recovered network clock. In an embodiment, the configuration controller is configured to determine configurations of programmable frequency dividers in the PLL circuit to align the interface clock to the recovered network clock in an example, the configuration controller is configured to detect an average frequency of the recovered network clock in a time window that is generated based on the system clock. For example, the configuration controller includes a window control circuit configured to define the time window based on the system clock, and generate a start/stop signal to indicate a start of the time window and a stop of the time window, and an error counter circuit configured to start counting based on the recovered network clock in response to the start of the time window and stop counting in response to the stop of the time window. In an example, the window control circuit includes a window counter configured to count a specific number of cycles in the system clock to define the time window. Further, the configuration controller includes a processor configured to execute software instructions to determine the specific number of cycles that defines the time window, and to determine the configuration of the PLL circuit based on the counted value by the error counter circuit.

In an embodiment, the configuration of the PLL circuit is maintained when the recovered network clock is not available.

According to an aspect of the disclosure, the plurality of interface circuits include serializer/deserializer (SerDes) circuit configured to convert data between serial format and parallel format.

In an embodiment, the one or more packet processors, the plurality of interface circuits, the PLL circuit, and the configuration controller are disposed in an integrated circuit (IC) package.

Aspects of the disclosure provide a method for network synchronization. The method includes receiving, at a master interface circuit among a plurality of interface circuits in a network device, a signal from another device coupled to the network device, recovering a network clock from the received signal, detecting a difference of an interface clock for driving the interface circuits relative to the recovered network clock, governing a configuration of a phase-locked loop (PLL) circuit based on the difference, generating, by the PLL circuit of the network device, the interface clock based on a system clock of the network device and the configuration of the PLL circuit, and driving the plurality of interface circuits for transmitting/receiving network communication using the interface clock.

Aspects of the disclosure provide a circuit that includes a plurality of interface circuits, a PLL circuit and a configuration controller. The plurality of interface circuits are configured to transmit and receive signals to/from other devices that are coupled to the circuit. A master interface circuit among the plurality of interface circuits is configured to recover a network clock from a received signal. The PLL circuit is configured to generate an interface clock based on a system clock of the circuit and a configuration of the PLL circuit and to provide the interface clock to the plurality of interface circuits to govern communication timings of the interface circuits. The configuration controller is configured to detect a difference of the interface clock relative to the recovered network clock, and to determine the configuration of the PLL circuit based on the difference to govern operation of the PLL circuit.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
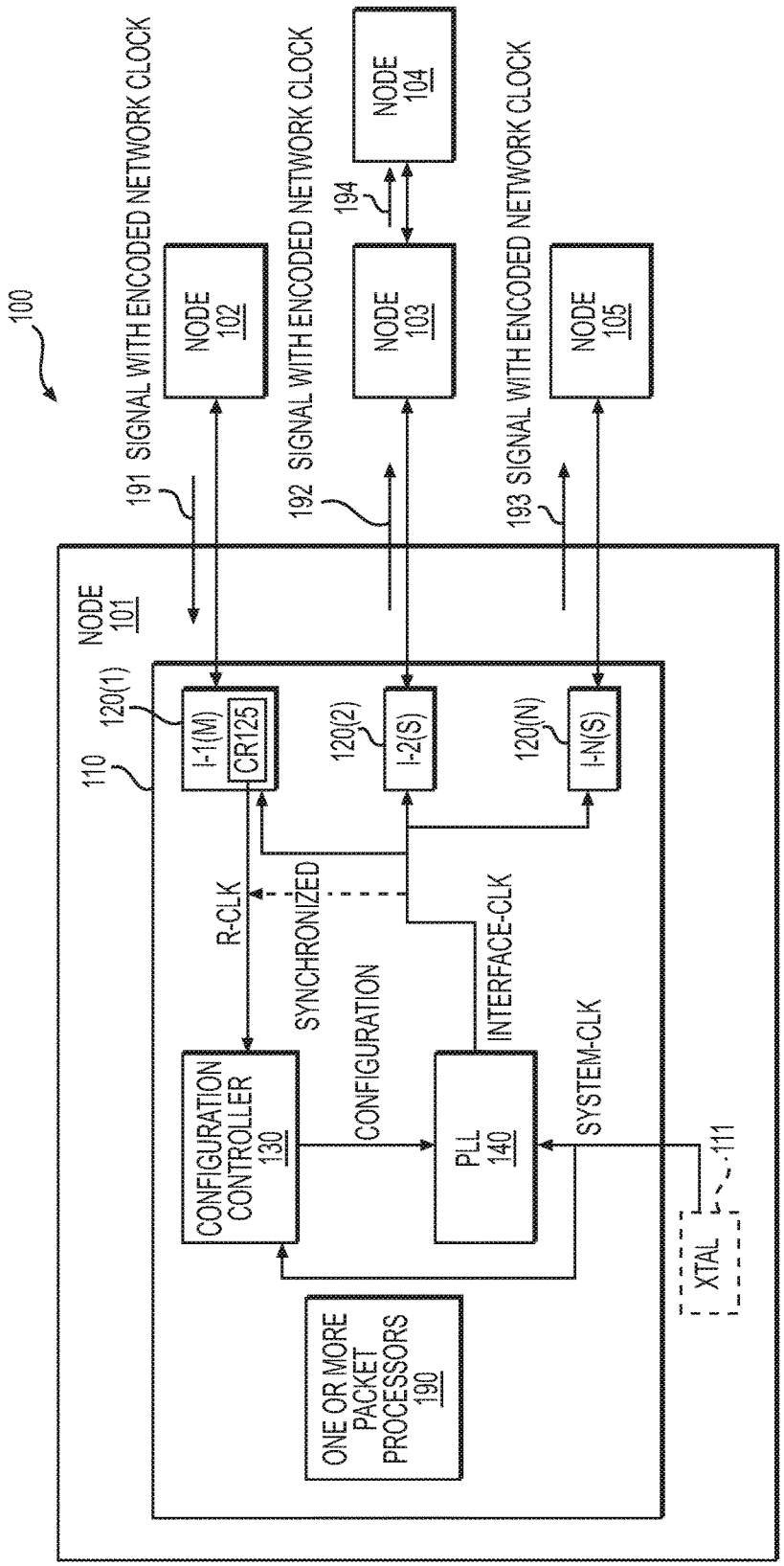
FIG. 1 shows a block diagram of a network example 100 that implements frequency synchronization according to an embodiment of the disclosure.

FIG. 1 shows a block diagram of a network example 100 that implements network synchronization according to an embodiment of the disclosure. The network 100 includes a plurality of nodes 101-105 coupled together via suitable physical network links, such as a direct serial/parallel connection, fiber optical cable, twisted pair cable and the like. Signals are transmitted among the plurality of nodes 101-105 by the links. In the network 100, at least one node, such as the node 101 is configured to recover a network clock synchronization signal from a received signal, lock an interface clock to the recovered network synchronization clock signal to generate a synchronized interface clock, and use the synchronized interface clock to perform various communications activities.

The network 100 can be any suitable network, such as a local area network (LAN), a wide area network (WAN), a mobile backbone network, a corporate network, a backbone network, and the like. In an embodiment, the network 100 is compliant with a synchronous Ethernet (SyncE) standard, which is an ITU-T standard for a synchronous Ethernet network. In the embodiment, a common network clock is used in the physical layer, for example, of the plurality of nodes 101-105 in the network TOO. In an example, the common network clock is encoded in signals transmitted among the plurality of nodes 101-105. The plurality of nodes 101-105 are configured to extract the common network clock from the received signals in the physical layer and perform network operations, for example receive and transmit communications, based on the common network clock. Thus, by extracting and using the common network clock, the communications of the nodes 101-105 in the network 100 maintain synchrony with the common network clock in an embodiment.

According to an aspect of the disclosure, synchronization (e.g., frequency synchronization and/or phase/time synchronization) is passed through the network 100 from hop to hop. For example, the node 101 receives and extracts the common network clock from signals (e.g., a signal 191) received from the node 102; then the node 101 sends signals (e.g., signals 192 and 193) encoded with the common network clock to the nodes 103 and 105. The nodes 103 and 105 receive and extract the common network clock from the signals received from the node 101, and send signals (e.g., a signal 194 ) encoded with the common network clock to nodes of next hops, such as the node 104 and the like. Because the synchronization is passed from hop to hop, nodes can be readily added and/or removed from the network 100 with ease, and the network 100 achieves relatively high scalability. Additionally, the network 100 achieves a relatively high clock accuracy, for example 0.01 parts per billion (ppb) frequency drift in one year.

According to the disclosure, respective ones of the plurality of nodes 101-105 include a network device, such as switch, router, network interface card (NIC), and the like, and are respectively configured to receive signals and/or transmit signals in the network 100. It is noted that, in an embodiment, the nodes 101-105 respectively include other suitable devices, such as a memory device, a microprocessor, a display, a camera, and the like, coupled to the network device, and are configured to process received signals and/or to generate signals for transmission.

Specifically, in the FIG. 1 example, the node 101 includes a network device 110. The network device 110 includes a plurality of interface circuits 120(1)-120(N) (N is a positive integer) configured to couple the node 101 with other nodes, such as the nodes 102, 103, 105 and the like, in the network 100. The interface circuits 120(1)-120(N) are configured to receive incoming signals that are transmitted from the other nodes, and to transmit outgoing signals to the other nodes. In an embodiment, the incoming signals correspond to incoming packets and the outgoing signals correspond to outgoing packets. In an embodiment, the network device 110 includes one or more packet processors 190 configured to process the incoming packets and generate the outgoing packets.

In an example, a packet is transmitted in the form of a bit stream. The bit stream is suitably encoded according to suitable coding techniques and the encoded bit stream is transmitted in response to rising edges and/or falling edges of a clock signal to encode network synchronization information in the transmitted signal.

In an embodiment, the one or more packet processors 190 are implemented using a pipeline architecture. A packet processor in pipeline architecture includes a plurality of engines respectively configured to perform specific packet processing operations. In another embodiment, the one or more packet processors 190 are implemented using run-to-finish processors configured to execute software instructions and each configured to perform a complete set of processing operations on a packet.

Further, the network device 110 includes a configuration controller 130, and a phase locked loop (PLL) 140 that are coupled with the interface circuits 120(1)-120(N) as shown in FIG. 1. Among the plurality of interface circuits 120(1)-120(N), an interface circuit, such as the interface circuit 120(1) is designated as a master interface circuit (M), and the other interface circuits are designated as slave interface circuits (S). It is noted that, in an embodiment, the designation of the master interface circuit is not fixed, and is dynamically changed based on, for example availability of a received signal, signal quality of the received signal, and the like.

According to an aspect of the disclosure, the master interface circuit 120(1), the configuration controller 130, the PLL 140 and the slave interface circuits 120(2)-120(N) form a path to pass synchronization. In an embodiment, the other nodes, for example, the nodes 102-105, in the network 100 are similarly configured as the node 101, and synchronization is passed from hop to hop during operation.

The interface circuits 120(1)-120(N) are any suitable interface circuits, in an embodiment, such as for example serial interface circuit, parallel interface circuit, Ethernet interface circuit, and the like. In an embodiment, each of the interface circuits 120(1)-120(N) includes a receiving circuit (not shown) and a transmitting circuit (not shown). In an example, the receiving circuit receives a signal from interconnection components (e.g., one or more metal wires) that couple the receiving circuit with for example a transmitting circuit in another node device. Further, in the example, the receiving circuit includes a data recovery circuit configured to detect a bit stream from the received signal. In an example, the receiving circuit in the master interface circuit, such as the interface circuit 120(1), also includes a clock recovery circuit (CR) 125 configured to generate a recovered network clock R-CLK from the received signal. The transmitting circuit includes a driving circuit configured to drive a bit stream onto interconnection components (e.g., one or more metal wires) that couple the transmitting circuit with for example a receiving circuit in another node device.

According to an aspect of the disclosure, the interface circuits 120(1)-120(N) operate based on an interface clock INTERFACE-CLK. In an example, the driving circuit drives the bit stream based on the interface clock INTERFACE-CLK. Thus, the interface clock INTERFACE-CLK is encoded in the signals driven out of the interface circuits 120(1)-120(N). In an example, the data recovery circuit can also operate based on the interface clock INTERFACE-CLK.

In the FIG. 1 example, the interface clock INTERFACE-UK is generated by the PLL 140. In an example, the PLL 140 is configurable and the PLL 140 generates the interface clock INTERFACE-CLK based on a system clock SYSTEM-CLK according to a configuration of the PLL 140. In an embodiment, the PLL 140 includes a frequency divider in a phase locked loop circuit to generate the interface clock INTERFACE-CLK based on the system clock SYSTEM-CLK. The frequency divider is configurable. For example, the frequency ratio between the interface clock INTERFACE-CLK to the system clock SYSTEM-CLK is programed according to digital values. For example, the PLL 140 includes a storage circuit, such as a register circuit, configured to store information corresponding to the ratio of the frequency divider, and the frequency divider is configured according to the stored information.

Additionally, in an example, the system clock SYSTEM-CLK is generated based on a crystal oscillator 111, and has a relatively stable frequency. Thus, the interface clock INTERFACE-CLK generated based on the system clock SYSTEM-CLK has relatively stable frequency.

According to an aspect of the disclosure, the recovered network clock and the system clock SYSTEM-CLK are provided to the configuration controller 130. The configuration controller 130 is configured to determine the configuration of the PLL 140 based on the two clocks, and provide a configuration signal to the PLL 140 to configure the PLL 140. In an embodiment, the configuration controller 130 is configured to determine the configuration of the PLL 140 to align the interface clock INTERFACE-CLK to the recovered network clock.

According to an aspect of the disclosure, the configuration controller 130 and the PLL 140 are coupled together to form a closed loop control system. For example, the configuration controller 130 monitors a misalignment (e.g., frequency error, phase error) between the recovered clock R-CLK and the interface clock INTERFACE-CLK (the interface clock INTERFACE-CLK is determined based on the system clock SYSTEM-CLK and the configuration of the PLL 140), determines an update of the configuration of the PLL 140 based on the misalignment, and provide the updated configuration to the PLL 140. Then the PLL 140 updates its configuration to generate the interface clock INTERFACE-CLK and bring the interface clock INTERFACE-CLK closer to the recovered clock R-CLK to align the interface clock INTERFACE-CLK to the recovered clock R-CLK. In an example, the configuration controller 130 and the PLL 140 are within a same device (e.g., same IC chip, same IC package) and are coupled together without occupying 10 resources (e.g., IO pads, etc.).

During operation, in an embodiment, the interface circuit 120(1) receives a signal 191 with a common network clock of the network 100 encoded in the signal 191. For example, the node 102 is a prior hop for the node 101. The node 102 encodes the common network clock in a signal 191, and transmits the signal 191 to the node 101, thus the interface circuit 120(1) receives the signal 191 with the common network clock encoded. The clock recover circuit in the interface circuit 120(1) generates the recovered network clock R-CLK from the received signal 191. The recovered network clock R-CLK is a recovered version of the common network clock.

The configuration controller 130 receives the recovered network clock R-CLK and the system clock SYSTEM-CLK, and determines, for example, the ratio of frequency divider in the PLL 140 to cause the interface clock INTERFACE-CLK to track the recovered network clock R-CLK, and thus to track the common network clock. The configuration controller 130 provides the configuration signal corresponding to the determined ratio to the PLL 140. According to the configuration signal, the PLL 140 is configured accordingly to generate the interface clock INTERFACE-CLK. The interface clock INTERFACE-CLK is provided to the interface circuits 120(1)-120(N) to control the timings of communications via the interface circuits 120(1)-120(N). In an example, the transmitting circuits in the interface circuits 120(1)-120(N) transmit based on the interface clock INTERFACE-CLK (e.g., transmit at rising edges and/or falling edges of the interface clock INTERFACE-CLK or a clock that is synchronized to the INTERFACE-CLK with a different frequency from the interface clock INTERFACE-CLK), thus the common network clock is encoded in the transmitted signals 192-193. The transmitted signals 192-193 then pass the common network clock to nodes on the next hop.

In an example, when the frequency of the common network clock changes, the interface circuit 120(1) receives the signal in which the common network clock is encoded. The interface circuit 120(1) then generates the recovered network clock R-CLK whose frequency changes accordingly. The configuration controller 130 detects the frequency change in the recovered network clock R-CLK, and determines a ratio adjustment of the frequency divider in the PLL 140 to cause the interface clock INTERFACE-CLK to follow the change. Then, the configuration controller 130 adjusts the configuration signal according to the ratio adjustment. The PLL 140 receives the configuration signal, and is configured according to the configuration signal. Thus, the frequency ratio of the frequency divider in the PLL 140 is changed accordingly, and the frequency of the interface clock INTERFACE-CLK changes as well, to follow changes in the common network clock, in an embodiment.

It is noted that, in an example, the interface clock INTERFACE-CLK is generated to have the same frequency as the recovered network clock R-CLK. In another example, the frequency ratio of the interface clock INTERFACE-CLK to the recovered network clock R-CLK is a fixed value (e.g., 1/5, 1/10, etc.) under a speed mode for example. In another example, an interface circuit of the interface circuits 120(1)-120(N) uses a frequency synthesizer to adjust a clock frequency used by the interface circuit based on the interface clock INTERFACE-CLK, thus the interface circuit is able to work at multiple speeds.

According to an aspect of the disclosure, the PLL 140 is configured according to the information stored in the register circuit, the system clock SYSTEM-CLK is generated based on the crystal oscillator 111 and is relatively stable, thus the interface clock INTERFACE-CLK output from the PLL 140 is relatively stable. In an embodiment, when the recovered clock R-CLK is stable, the network device 110 is in a tracking state. In the tracking state, the closed loop system that is formed by the configuration controller 130 and the PLL 140 synchronizes the interface clock INTERFACE-CLK to the recovered clock R-CLK. In an example, when the interface circuit 120(1) experiences an interrupt in the received signal, the recovered network clock R-CLK may lose track of the common network clock and is not stable. In the example, when the recovery of the recovered network clock R-CLK fails, the network device 110 enters a holdover state. In the hold over state, the closed loop system that is formed by the configuration controller 130 and the PLL 140 maintains the interface clock INTERFACE-CLK to be stable. In the example, in the holdover state, the register circuit maintains the stored information, thus the PLL 140 stably generates the interface clock INTERFACE-CLK based on the information in the register circuit. When the received signal recovers from the interrupt, or another interface circuit is designated as the master interface circuit to receive a stable input signal, the recovered network clock R-CLK becomes stable, the network device 110 returns to the tracking state. In the tracking state, the configuration controller 130 then determines a ratio adjustment based on the recovered network clock R-CLK that is stable. In an example, the configuration controller 130 gradually adjusts the configuration signal to the PLL 140, thus the PLL 140 gradually changes the frequency ratio and re-locks the interface clock INTERFACE-CLK to the common network clock of the network 100 for example.

According to an aspect of the disclosure, the network device 110 is implemented in an integrated circuit (IC) package. In an embodiment, the IC package is a multi-chip module (MCM) that includes multiple dies, such as a core die and a plurality of peripheral dies that are packaged together in a shared package to make a complete device. In an example, one or more packet processors are implemented on the core die, the plurality of interface circuits are respectively implemented in the peripheral dies, the configuration controller 130 and the PLL 140 are implemented either on the core die or one of the peripheral dies.

In another example, the IC package includes an IC chip, and components of the network device 110, such as one or more packet processors, the plurality of interface circuits, the configuration controller 130, the PLL 140 and other circuits, are integrated on the IC chip.

In a related example, a related network device uses a separate IC package to generate a clock signal based on an input signal to the related network device, then the clock signal is input to the related network device and used by the related network device for communication. The related network device consumes more silicon area for input/output and routing, consumes more time and material in packaging and testing, thus the related network device costs more than the network device 100.

It is noted that, in an embodiment, the configuration controller 130 and the PLL 140 are implemented at least partially using existing components that are previously used for other purpose.

Figure 2:
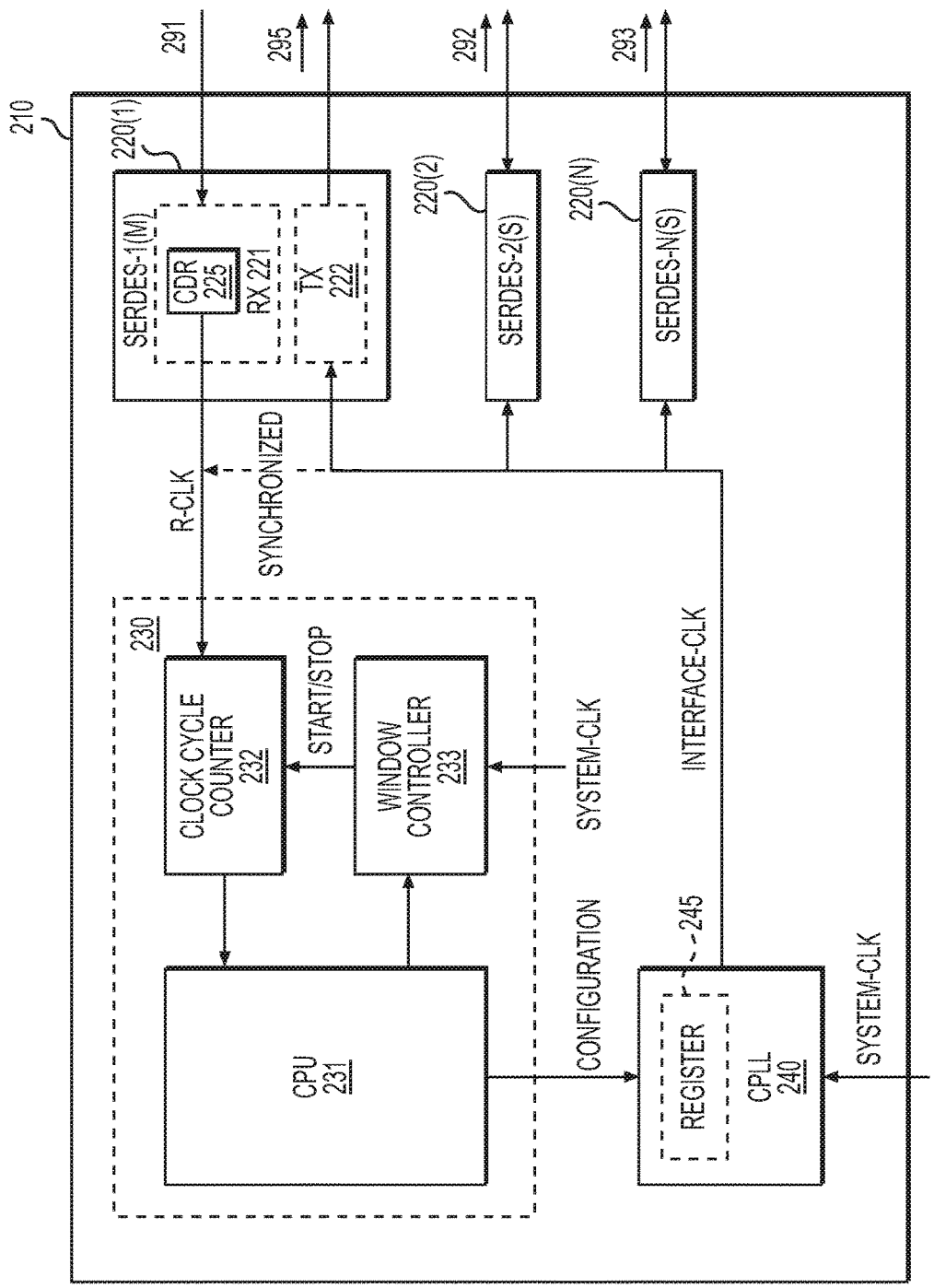
FIG. 2 shows a block diagram of a circuit example 210 according to an embodiment of the disclosure.

FIG. 2 shows a block diagram of a network device 210 according to an embodiment of the disclosure. In an example, the network device 210 is used in the network 100 in the place of the network device 110. The network device 210 is implemented partially using existing components.

The network device 210 operates similarly to the network device 110 above. The network device 210 utilizes certain components that are identical or equivalent to those used in the network device 110; the description of these components has been provided above and will be omitted here for clarity purposes.

Specifically, in the FIG. 2 example, the plurality of interface circuits 220(1)-220(N) (N is a positive integer) are Ethernet ports 220(1)-220(N) that respectively include serializer/deserializer (SERDES) circuits. In an example, the Ethernet ports 220(1)-220(N) are coupled with external interconnection components (not shown), such as Ethernet cables, during operation. The Ethernet ports 220(1)-220(N) are configured to receive incoming signals that are transmitted from other devices via the external interconnection components, and transmit outgoing signals to the other devices via the external interconnection components according to Ethernet standard. In an embodiment, the incoming signals correspond to incoming packets and the outgoing signals correspond to outgoing packets. In an embodiment, the network device 210 includes one or more packet processors (not shown) configured to process the incoming packets and to forward and/or generate the outgoing packets.

Among the plurality of the Ethernet ports 220(1)-220(N), an Ethernet port, such as the Ethernet port 220(1) is designated as a master port (M), and the other Ethernet ports are designated as slave ports (S). It is noted that, in an embodiment, the designation of the master port is not fixed, and is dynamically changed based on, for example availability of a received signal, signal quality of the received signal, and the like.

In the FIG. 2 example, the master port 220(1) includes a receiving circuit RX 221, and a transmitting circuit TX 222. The receiving circuit RX 221 includes a clock and data recovery circuit CDR 225 configured to receive an electrical signal 291 that carries a bit stream corresponding to packets. The clock and data recovery circuit CDR 225 recovers the bit stream from the electrical signal 191, and generates a recovered network clock signal R-CLK from the electrical signal 191. In an example, the CDR 225 includes an edge detection circuit (not shown) and a voltage controlled oscillator (VCO) (not shown) to form a phase locked clock recovery circuit to generate the recovered network clock R-CLK. The recovered network clock signal R-CLK is provided to the configuration controller 230.

In an example, the master port 220(1) is coupled to another device via a 10 Gigabit Ethernet link. The SERDES-1 converts data between parallel format and serial format, In an example, the recovered network frequency R-CLK has a frequency of 625 MHz.

In an embodiment, the transmitting circuit TX 222 includes a driving circuit configured to drive a bit stream onto the Ethernet cable that couples the transmitting circuit TX 222 with for example a receiving circuit in another node device.

in an example, the Ethernet ports 220(1)-220(N) are similarly configured as the Ethernet port 220(1). The Ethernet ports 220(1)-220(N) operate based on the interface clock INTERFACE-CLK. In an example, the driving circuit drives the bit stream based on the interface clock INTERFACE-CLK. Thus, the interface clock INTERFACE-CLK is encoded in the signals 292, 293 and 295 and driven out of the interface circuits 220(1)-220(N). In an example, the interface clock INTERFACE-CLK has a frequency of 156.25 MHz to support the 10 Gigabit Ethernet link.

In the FIG. 2 example, the interface clock INTERFACE-CLK is generated by the PLL 240 and the PLL 240 is implemented using a clean jitter PLL (CPLL) 240 that is an existing component previously for cleaning jitters in a clock signal, such as the system clock SYSTEM-CLK, or a clock signal that is generated by an external telco ILL device and input in the network device 210. In an example, the jitters are introduced by clock routing paths. The CPLL 240 is configured to provide low jitter clock signal.

In an example, the CPLL 240 is configurable and the CPLL 240 generates the interface clock INTERFACE-CLK based on the system clock SYSTEM-CLK according to the configuration of the CPLL 240. In an embodiment, the CPLL 240 includes a frequency divider in a phase locked loop circuit to generate the interface clock INTERFACE-CLK based on the system clock SYSTEM-CLK. The frequency divider is configurable. For example, the frequency ratio of the interface clock INTERFACE-CLK to the system clock SYSTEM-CLK is programed according to digital values. In the FIG. 2 example, the CPU 240 includes a register circuit 245 configured to store bits corresponding to the ratio of the frequency divider, and the frequency divider is configured according to the bits stored in register circuit 245.

In an example, the system clock SYSTEM-CLK is provided by an external crystal oscillator (not shown), and has a relatively stable frequency. In an example, the system clock SYSTEM-CLK has a frequency of 25 MHz.

In the FIG. 2 example, the configuration controller 230 includes a central processing unit (CPU) 231, a clock cycle counter 232 and a window controller 233 coupled together as shown in FIG. 2. The CPU 231 is an existing component that is disposed in a network device and that is configured to execute software instructions to perform various packet processing, control and/or computation functions in the network device 210. In an example, the clock cycle counter 232 and the window controller 233 are implemented using additional logic circuits, and the additional logic circuits are coupled with the CPU 231 to form the configuration controller 230.

In an example, the CPU 231 is configured to execute software instructions to provide information to the window controller 233. Then, the CPU 231 is configured to receive error information from the clock cycle counter 232, then determine the configuration for the CPLL 240. In an embodiment, the software instructions are stored in a memory (not shown) in the network device 210. In another embodiment, the software instructions are stored in a memory that is external of the network device 210.

In an example, the CPU 231 determines a number (C1) of cycles of the system clock SYSTEM-CLK to define a time window, and provides the number of cycles to the window controller 233. In an example, the CPU 231 uses 36 bits to provide the number of cycles to the window controller 233. The window controller 233 receives the system clock SYSTEM-CLK and counts in response to the system clock SYSTEM-CLK to define the time window. The window controller 233 outputs a start/stop signal to the clock cycle counter 232 that defines the time window. In an example, the window controller 233 includes a window counter (not shown) that counts in response to the system clock SYSTEM-CLK, thus the counted value corresponds to cycles of the system clock SYSTEM-CLK. In an example, the start/stop signal is generated based on the activity of the window counter. For example, when the window counter starts counting (e.g., from zero), the window controller 233 provides a start signal (e.g., a signal transition from a low voltage level to a high voltage level) to indicate a start. When the counted value by the window counter equals the number of cycles provided by the CPU 231, the window counter stops. When the window counter stops, the window controller 233 provides the stop signal (e.g., a signal transition from a high voltage level to a low voltage level) to indicate a stop.

In an example, the window counter is a 36-bit counter, and the system clock SYSTEM-CLK has a frequency ($f_S$) of 25 MHz frequency. Thus, the maximum time window is calculated as shown by Eq. 1:

$$2^{36} \times \left(\frac{1}{25 \times 10^6}\right) = 2748 \text{ second} \quad \text{Eq. 1}$$

In an embodiment, the clock cycle counter 232 is configured to count based on the recovered network clock R-CLK, thus the counted value (C2) by the clock cycle counter 232 corresponds to cycles of the recovered network clock R-CLK. In an example, the clock cycle counter 232 is configured to start counting (e.g., from zero) when the clock cycle counter 232 receives the start signal, and stop counting when the clock cycle counter 232 receives the stop signal.

Thus, in an example, the counted value by the clock cycle counter 232 is used to calculate an average frequency of the recovered network clock R-CLK. For example, the average frequency is calculated as shown in Eq. 2:

$$f_A = \frac{C2}{C1} \times f_S \quad \text{Eq. 2}$$

where $f_A$ denotes the average frequency, $f_S$ denotes the frequency of the system clock SYSTEM-CLK, C1 denotes the number of cycles of the system clock SYSTEM-CLK that is determined by the CPU 231 to define the time window, and C2 denotes the counted value by the clock cycle counter 232.

In an example, a change in the counted value by the clock cycle counter 232 is indicative of a phase shift/drift of the interface clock INTERFACE-CLK relative to the recovered network clock R-CLK. When the recovered network clock R-CLK has a frequency of 625 MHz, the resolution of drift detection is calculated as shown in Eq. 3, and is better than the requirement ($10^{-11}$) for Synchronous Ethernet:

$$\frac{1}{625 \times 10^6} \Big/ 2748 = 0.58 \times 10^{-12} \quad \text{Eq. 3}$$

The CPU 231 receives the counted value by the clock cycle counter 232, and determines for example phase offset error of the interface clock INTERFACE-CLK to the recovered clock R-CLK. Further, the CPU 231 determines an update to the configuration of the CPLL 240 to cancel the phase offset error, and provides for example bits to store in the register circuit 245 to update the configuration of the CPLL 240. In an example, the CPU 231 determines the configuration to cancel the phase offset error according to a look-up table for the CPLL 240.

The CPU 240 receives the bits, and stores the bits in the register circuit 245 to update its configuration. The CPLL 240 then generates the interface clock INTERFACE-CLK based on the system clock SYSTEM-CLK according to the configuration of the CPU 240.

During operation, in an embodiment, the Ethernet port 220(1) receives a signal encoded with a common network clock that is used for network synchronization. The CDR 225 generates the recovered network clock R-CLK from the received signal. The recovered network clock R-CLK is a recovered version of the common network clock. The clock cycle counter 232 then counts cycles of the recovered network clock R-CLK in the time window. The change of the counted value is indicative of the phase shift/drift of the interface clock INTERFACE-CLK relative to the common network clock. The CPU 231 determines an update of the configuration of the CPLL 240 to cancel the phase shift/drift, and provides the configuration signal to update the configuration of the CPLL 240. Then, the CPLL 240 updates the configuration, and generates the interface clock INTERFACE-CLK with phase shift/drift being cancelled, thus the interface clock INTERFACE-CLK is aligned to the common network clock. When the Ethernet port 220(1)-220(N) transmit signals based on the interface clock INTERFACE-CLK, the common network clock is encoded in the transmitted signals that are transmitted to next hops.

It is noted that, in another embodiment, the counted value by the clock cycle counter 232 is directly input to the CPLL 240. The CPLL 240 includes additional logics to determine the configuration of the CPLL 240 based on the counted value to cancel the phase shift/drift of the interface clock INTERFACE-CLK to the common network clock.

Figure 3:
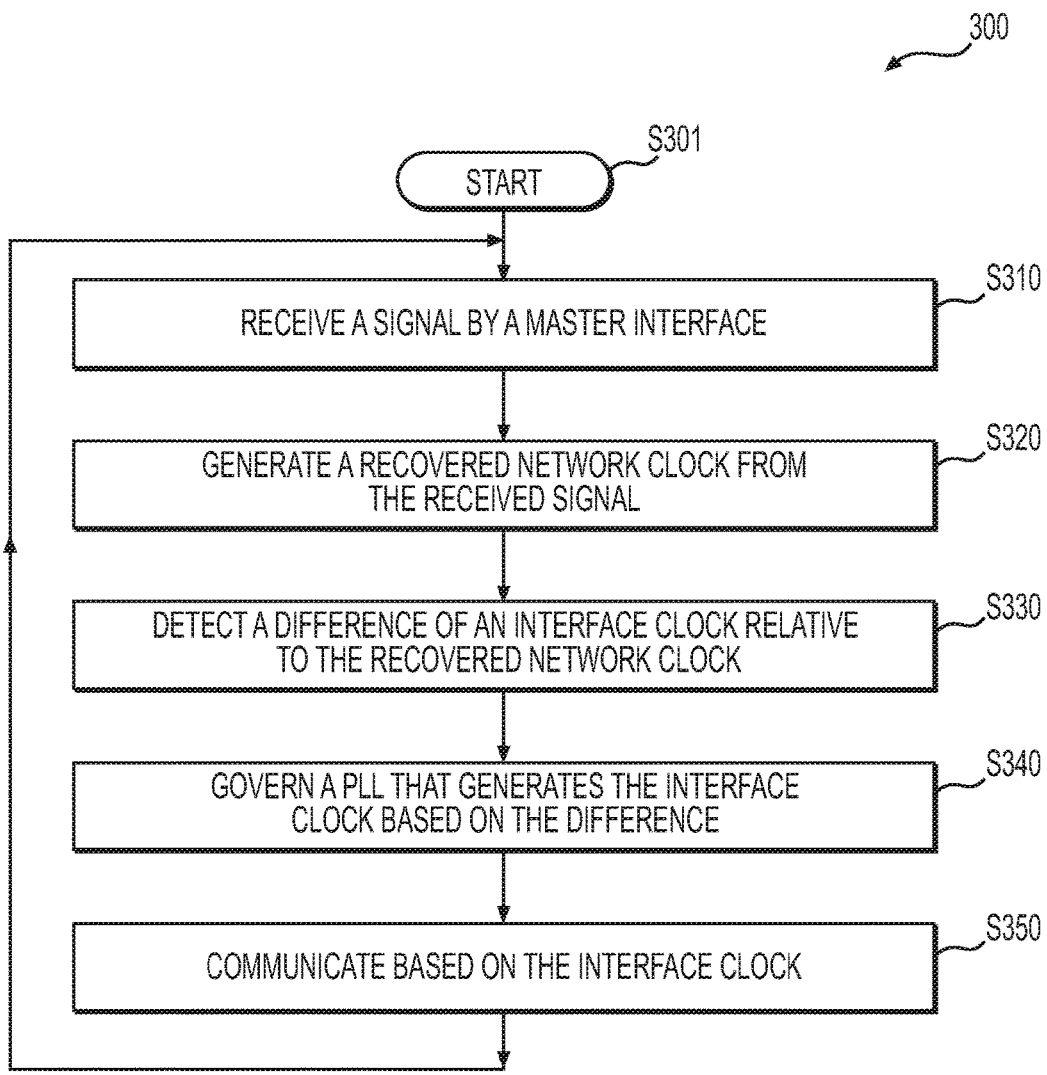
FIG. 3 shows a flow chart outlining a process example executed in the network 100 according to an embodiment of the disclosure.

FIG. 3 shows a flow chart outlining a process 300 example according to an embodiment of the disclosure. In an example, the process 300 is executed by a network device, such as the network device 110 in the FIG. 1 example, the network device 210 in the FIG. 2 example. The process starts at S301 and proceeds to 5310.

At S310, a signal is received by a mater interface. In an example, the master port 220(1) is coupled to another device via an Ethernet link, such as 10 Gigabit Ethernet link, The master port 22(1) receives an electrical signal of a bit stream from the Ethernet link.

At S320, a recovered network clock is generated from the received signal. In an example, the SERVES-1 converts the bit stream from serial format to parallel format. The CDR 225 recovers data and clock. For example, the CDR 225 outputs the recovered network clock R-CLK.

At S330, a difference of an interface clock relative to the recovered network clock is detected. In an example, the window controller 233 outputs a start/stop signal that defines the time window to the clock cycle counter 232. In an example, the time window is defined as a specific number of cycles of the system clock SYSTEM-CLK. The clock cycle counter 232 is configured to count cycles of the recovered network clock R-CLK in the time window. In an example, the counted value by the clock cycle counter 232 is used to detect a phase shift/drift of the interface clock INTERFACE-CLK relative to the recovered network clock R-CLK.

At S340, a PLL is governed based on the difference. In an example, the CPU 231 receives the counted value by the clock cycle counter 232, and determines phase offset error based on the counted value. Further, the CPU 231 determines an update to the configuration of the CPLL 240 to cancel the phase offset error, and provides for example bits to store in the register circuit 245 to update the configuration of the CPLL 240. The CPLL 240 generates the interface clock INTERFACE-CLK based on the system clock SYSTEM-CLK according to the configuration of the CPLL 240.

At S350, the network device communicates based on the interface clock. In an example, the transmitting circuits in the Ethernet ports 220(1)-220(N) transmit electrical signals based on the interface clock INTERFACE-CLK. When the interface clock INTERFACE-CLK is aligned with the recovered network clock R-CLK, the network clock is encoded in the electrical signals, and transmitted to next hops. Then, in an example, the process returns to S310, the network device continually tracks the network clock from the signal received by the master interface, and continually cancels, for example, residual phase offset, phase drift due to temperature changes of the network device, and the like. In another example, the process enters a wait state to wait for a time duration, and then returns to S310. The time duration is defined by software based on expected phase shift calculation in an example.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A network device comprising:
   a packet processor and a plurality of interface circuits, the interface circuits being configured to transmit and receive signals to/from other devices that are coupled to the network device;
   a master interface circuit among the plurality of interface circuits, the master interface circuit being configured to recover a network clock from a received signal;
   a phase-locked loop (PLL) circuit configured to generate an interface clock based on a system clock of the network device and a configuration of the PLL circuit and to provide the interface clock to the plurality of interface circuits to govern communication timings of the interface circuits; and
   a configuration controller configured to detect a difference of the interface clock relative to the recovered network dock, and to determine the configuration of the PLL circuit based on the difference to govern an operation of the PLL circuit.

2. The network device of claim 1, wherein the configuration controller is configured determine the configuration of the PLL circuit to align the interface clock to the recovered network clock.

3. The network device of claim 2, wherein the configuration controller is configured to determine configurations of programmable frequency dividers in the PLL circuit to align the interface clock to the recovered network clock.

4. The network device of claim 1, wherein the configuration controller is configured to detect an average frequency of the recovered network clock in a time window that is generated based on the system clock.

5. The network device of claim 4, wherein the configuration controller comprises:
   a window control circuit configured to define the time window based on the system clock, and generate a start/stop signal to indicate a start of the time window and a stop of the time window; and
   an error counter circuit configured to start counting based on the recovered network clock in response to the start of the time window and stop counting in response to the stop of the time window.

6. The network device of claim 5, wherein the window control circuit includes a window counter configured to count a specific number of cycles in the system clock to define the time window.

7. The network device of claim 6, wherein the configuration controller further comprises:

a processor configured to execute software instructions to determine the specific number of cycles that defines the time window, and to determine the configuration of the PLL circuit based on a counted value by the error counter circuit.

8. The network device of claim 1, wherein the configuration of the PLL circuit is maintained when the recovered network clock is not available.

9. The network device of claim 1, wherein the plurality of interface circuits include serializer/deserializer (SerDes) circuit configured to convert data between a serial format and a parallel format.

10. The network device of claim 1, wherein the packet processor, the plurality of interface circuits, the PLL circuit, and the configuration controller are disposed in an integrated circuit (IC) package.

11. A method for network synchronization, comprising:
receiving, at a master interface circuit among a plurality of interface circuits in a network device, a signal from another device coupled to the network device;
recovering a network clock from the received signal;
detecting a difference of an interface clock for driving the interface circuits relative to the recovered network clock;
governing a configuration of a phase-locked loop (PLL) circuit based on the difference;
generating, by the PLL circuit of the network device, the interface clock based on a system clock of the network device and the configuration of the PLL circuit; and
driving the plurality of interface circuits for transmitting and receiving network communications using the interface clock.

12. The method of claim 11, wherein governing the configuration of the PLL circuit based on the difference further comprises:
governing the configuration of the PLL circuit to align the interface clock to the recovered network clock.

13. The method of claim 12, wherein governing the configuration of the PLL circuit to align the interface clock to the recovered network clock further comprises:
governing configurations of programmable frequency dividers in the PLL circuit to align the interface clock to the recovered network clock.

14. The method of claim 11, wherein detecting the difference of the interface clock for driving the interface circuits relative to the recovered network clock further comprises:
detecting an average frequency of the recovered network clock in a time window that is generated based on the system clock.

15. The method of claim 14, wherein detecting the average frequency of the recovered network clock in the time window that is generated based on the system clock further comprises:

generating a start/stop signal to define a start of the time window and a stop of the time window;
starting to count based on the recovered network clock in response to the start of the time window; and
stopping the count in response to the stop of the time window.

16. The method of claim 15, wherein generating the start/stop signal to define the start of the time window and the stop of the time window further comprises:
counting a specific number of cycles in the system clock to define the time window.

17. The method of claim 11, further comprising:
maintaining the configuration of the PLL circuit when the recovered network clock is not available.

18. A circuit, comprising:
a plurality of interface circuits, the interface circuits being configured to transmit and receive signals to/from other devices that are coupled to the circuit;
a master interface circuit among the plurality of interface circuits, the master interface circuit being configured to recover a network clock from a received signal;
a phase-locked loop (PLL) circuit configured to generate an interface clock based on a system clock of the circuit and a configuration of the PLL circuit and to provide the interface clock to the plurality of interface circuits to govern communication timings of the interface circuits; and
a configuration controller configured to detect a difference of the interface clock relative to the recovered network clock, and to determine the configuration of the PLL circuit based on the difference to govern an operation of the PLL circuit.

19. The circuit of claim 18, wherein the configuration controller is configured determine the configuration of the PLL circuit to align the interface clock to the recovered network clock.

20. The circuit of claim 19, wherein the configuration controller comprises:
a window control circuit configured to define a time window based on the system clock, and generate a start/stop signal to indicate a start of the time window and a stop of the time window;
an error counter circuit configured to start counting based on the recovered network clock in response to the start of the time window and stop counting in response to the stop of the time window; and
a processor configured to determine the configuration of the PLL circuit based on a counted value by the error counter circuit to align the interface clock to the recovered network clock.

* * * * *